US008848259B2

(12) United States Patent
Motoyama

(10) Patent No.: US 8,848,259 B2
(45) Date of Patent: Sep. 30, 2014

(54) MEDIA PROCESSING DEVICE AND METHOD OF CONTROLLING A MEDIA PROCESSING DEVICE

(75) Inventor: Hiroyuki Motoyama, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 52 days.

(21) Appl. No.: 13/611,413

(22) Filed: Sep. 12, 2012

(65) Prior Publication Data
US 2013/0077136 A1    Mar. 28, 2013

(30) Foreign Application Priority Data

Sep. 22, 2011 (JP) ................................ 2011-207191

(51) Int. Cl.
*H04N 1/04*        (2006.01)
(52) U.S. Cl.
CPC ....................................... *H04N 1/04* (2013.01)
USPC ........... 358/3.28; 358/498; 358/497; 358/474
(58) Field of Classification Search
USPC ......................... 358/3.28, 498, 497, 474, 505
See application file for complete search history.

(56) References Cited

U.S. PATENT DOCUMENTS

| 6,147,770 | A | 11/2000 | Unishi et al. |
| 7,123,390 | B2 | 10/2006 | Sato |
| 2010/0073128 | A1* | 3/2010 | Talwerdi ........................ 340/5.8 |

FOREIGN PATENT DOCUMENTS

| JP | 09-051444 A | 2/1997 |
| JP | 10-065872 A | 3/1998 |
| JP | 2003-110807 A | 4/2003 |
| JP | 2006-031298 A | 2/2006 |
| JP | 2010-134579 A | 6/2010 |
| JP | 2011-160254 A | 8/2011 |

* cited by examiner

*Primary Examiner* — Houshang Safaipour

(57) ABSTRACT

A media processing device improves the recognition rate of magnetic ink character data from magnetic ink characters printed on a medium. The media processing device 1 has a magnetic reading unit 41 that acquires the magnetic data of magnetic ink characters S2 from a check S1; and a front image scanner unit 25 that exposes the check S1 to a front image scanning light and acquires front image data. When at least a magnetic data read command to read magnetic ink characters S2 is received from a computer 80, the front image scanner unit 25 is set to a front image scanning mode 11 that acquires front image data using infrared light as the front image data. The check processing device 1 acquires the magnetic data and front image data, and sends the acquired data to the computer 80. The computer 80 recognizes the magnetic ink characters S2.

11 Claims, 7 Drawing Sheets

FIG. 4

Top table:

| MODE | IMAGE | LED COLOR1 | LED COLOR2 | BACK IMAGE SCANNER UNIT | | | | |
|---|---|---|---|---|---|---|---|---|
| | | | | 1 | 2 | 3 | 4 | 5 |
| | | | | GRAY SCALE | | | RGB | IR |
| | | | | R | G | B | | |
| | | | | − | − | − | − | − |
| FRONT IMAGE SCANNER UNIT | | | | | | | | |
| 1 | GRAY SCALE | R | − | CONVEYANCE SPEED 1 | CONVEYANCE SPEED 1 | CONVEYANCE SPEED 1 | CONVEYANCE SPEED 1 | CONVEYANCE SPEED 1 |
| 2 | GRAY SCALE | G | − | CONVEYANCE SPEED 1 | CONVEYANCE SPEED 1 | CONVEYANCE SPEED 1 | CONVEYANCE SPEED 1 | CONVEYANCE SPEED 1 |
| 3 | GRAY SCALE | B | − | CONVEYANCE SPEED 1 | CONVEYANCE SPEED 1 | CONVEYANCE SPEED 1 | CONVEYANCE SPEED 1 | CONVEYANCE SPEED 1 |
| 4 | | RGB | − | CONVEYANCE SPEED 1 | CONVEYANCE SPEED 1 | CONVEYANCE SPEED 1 | CONVEYANCE SPEED 1 | CONVEYANCE SPEED 1 |
| 5 | | IR | − | CONVEYANCE SPEED 2 | CONVEYANCE SPEED 2 | CONVEYANCE SPEED 2 | CONVEYANCE SPEED 2 | CONVEYANCE SPEED 2 |
| 6 | GRAY SCALE+IR | R | IR | CONVEYANCE SPEED 3 | CONVEYANCE SPEED 3 | CONVEYANCE SPEED 3 | CONVEYANCE SPEED 3 | CONVEYANCE SPEED 3 |
| 7 | | G | IR | CONVEYANCE SPEED 3 | CONVEYANCE SPEED 3 | CONVEYANCE SPEED 3 | CONVEYANCE SPEED 3 | CONVEYANCE SPEED 3 |
| 8 | | B | IR | CONVEYANCE SPEED 3 | CONVEYANCE SPEED 3 | CONVEYANCE SPEED 3 | CONVEYANCE SPEED 3 | CONVEYANCE SPEED 3 |
| 9 | | RGB | IR | CONVEYANCE SPEED 3 | CONVEYANCE SPEED 3 | CONVEYANCE SPEED 3 | CONVEYANCE SPEED 3 | CONVEYANCE SPEED 3 |
| 10 | COLOR | RGB | − | CONVEYANCE SPEED 2 | CONVEYANCE SPEED 2 | CONVEYANCE SPEED 2 | CONVEYANCE SPEED 2*1 | CONVEYANCE SPEED 4 |
| 11 | COLOR+IR | RGB | IR | CONVEYANCE SPEED 4 | CONVEYANCE SPEED 4 | CONVEYANCE SPEED 4 | CONVEYANCE SPEED 4*1 | CONVEYANCE SPEED 4 |

Bottom table:

| MODE | IMAGE | LED COLOR1 | LED COLOR2 | BACK IMAGE SCANNER UNIT | | | | | |
|---|---|---|---|---|---|---|---|---|---|
| | | | | 6 | 7 | 8 | 9 | 10 | 11 |
| | | | | GRAY SCALE+IR | | | | COLOR | COLOR+IR |
| | | | | R | G | B | RGB | RGB | RGB |
| | | | | IR | IR | IR | IR | − | IR |
| FRONT IMAGE SCANNER UNIT | | | | | | | | | |
| 1 | GRAY SCALE | R | − | CONVEYANCE SPEED 3 | CONVEYANCE SPEED 3 | CONVEYANCE SPEED 3 | CONVEYANCE SPEED 3 | CONVEYANCE SPEED 2 | CONVEYANCE SPEED 4 |
| 2 | GRAY SCALE | G | − | CONVEYANCE SPEED 3 | CONVEYANCE SPEED 3 | CONVEYANCE SPEED 3 | CONVEYANCE SPEED 3 | CONVEYANCE SPEED 2 | CONVEYANCE SPEED 4 |
| 3 | GRAY SCALE | B | − | CONVEYANCE SPEED 3 | CONVEYANCE SPEED 3 | CONVEYANCE SPEED 3 | CONVEYANCE SPEED 3 | CONVEYANCE SPEED 2 | CONVEYANCE SPEED 4 |
| 4 | | RGB | − | CONVEYANCE SPEED 3 | CONVEYANCE SPEED 3 | CONVEYANCE SPEED 3 | CONVEYANCE SPEED 3 | CONVEYANCE SPEED 2 | CONVEYANCE SPEED 4 |
| 5 | | IR | − | CONVEYANCE SPEED 3 | CONVEYANCE SPEED 3 | CONVEYANCE SPEED 3 | CONVEYANCE SPEED 3 | CONVEYANCE SPEED 2 | CONVEYANCE SPEED 4 |
| 6 | GRAY SCALE+IR | R | IR | CONVEYANCE SPEED 3 | CONVEYANCE SPEED 3 | CONVEYANCE SPEED 3 | CONVEYANCE SPEED 3 | CONVEYANCE SPEED 4 | CONVEYANCE SPEED 4 |
| 7 | | G | IR | CONVEYANCE SPEED 3 | CONVEYANCE SPEED 3 | CONVEYANCE SPEED 3 | CONVEYANCE SPEED 3 | CONVEYANCE SPEED 4 | CONVEYANCE SPEED 4 |
| 8 | | B | IR | CONVEYANCE SPEED 3 | CONVEYANCE SPEED 3 | CONVEYANCE SPEED 3 | CONVEYANCE SPEED 3 | CONVEYANCE SPEED 4 | CONVEYANCE SPEED 4 |
| 9 | | RGB | IR | CONVEYANCE SPEED 4 | CONVEYANCE SPEED 4 | CONVEYANCE SPEED 4 | CONVEYANCE SPEED 4 | CONVEYANCE SPEED 4 | CONVEYANCE SPEED 4 |
| 10 | COLOR | RGB | − | CONVEYANCE SPEED 4 | CONVEYANCE SPEED 4 | CONVEYANCE SPEED 4 | CONVEYANCE SPEED 4*1 | CONVEYANCE SPEED 4*1 | CONVEYANCE SPEED 4*1 |
| 11 | COLOR+IR | RGB | IR | CONVEYANCE SPEED 4 | CONVEYANCE SPEED 4 | CONVEYANCE SPEED 4 | CONVEYANCE SPEED 4*1 | CONVEYANCE SPEED 4*1 | CONVEYANCE SPEED 4*1 |

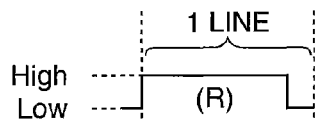
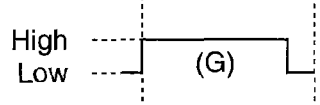
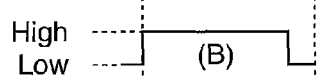
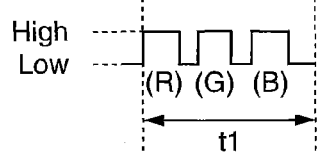
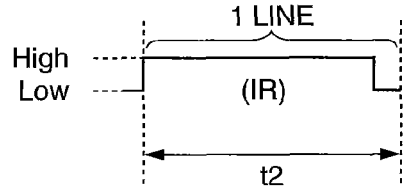
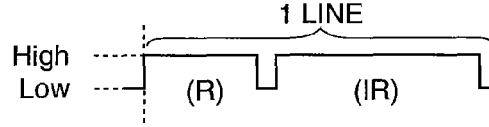
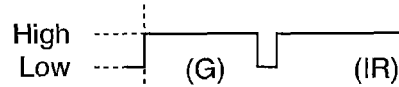
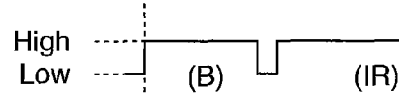
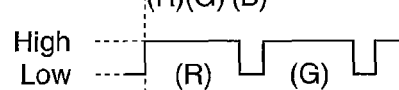
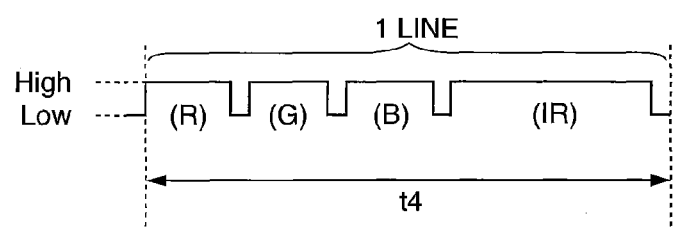

| MODE | IMAGE | LED COLOR 1 | LED COLOR 2 | LED COLOR 3 |
|---|---|---|---|---|
| 1 | GRAY SCALE | R | – | – |
| 2 | | G | – | – |
| 3 | | B | – | – |
| 4 | | RGB | – | – |
| 5 | | IR | – | – |
| 6 | GRAY SCALE + IR | R | IR | – |
| 7 | | G | IR | – |
| 8 | | B | IR | – |
| 9 | | RGB | IR | – |
| 10 | COLOR | RGB | – | – |
| 11 | COLOR + IR | RGB | IR | – |
| 12 | GRAY SCALE | UV | – | – |
| 13 | GRAY SCALE + UV | R | UV | – |
| 14 | | G | UV | – |
| 15 | | B | UV | – |
| 16 | | RGB | UV | – |
| 17 | | IR | UV | – |
| 18 | GRAY SCALE + IR + UV | R | IR | UV |
| 19 | | G | IR | UV |
| 20 | | B | IR | UV |
| 21 | | RGB | IR | UV |
| 22 | COLOR + UV | RGB | UV | – |
| 23 | COLOR + IR + UV | RGB | IR | UV |

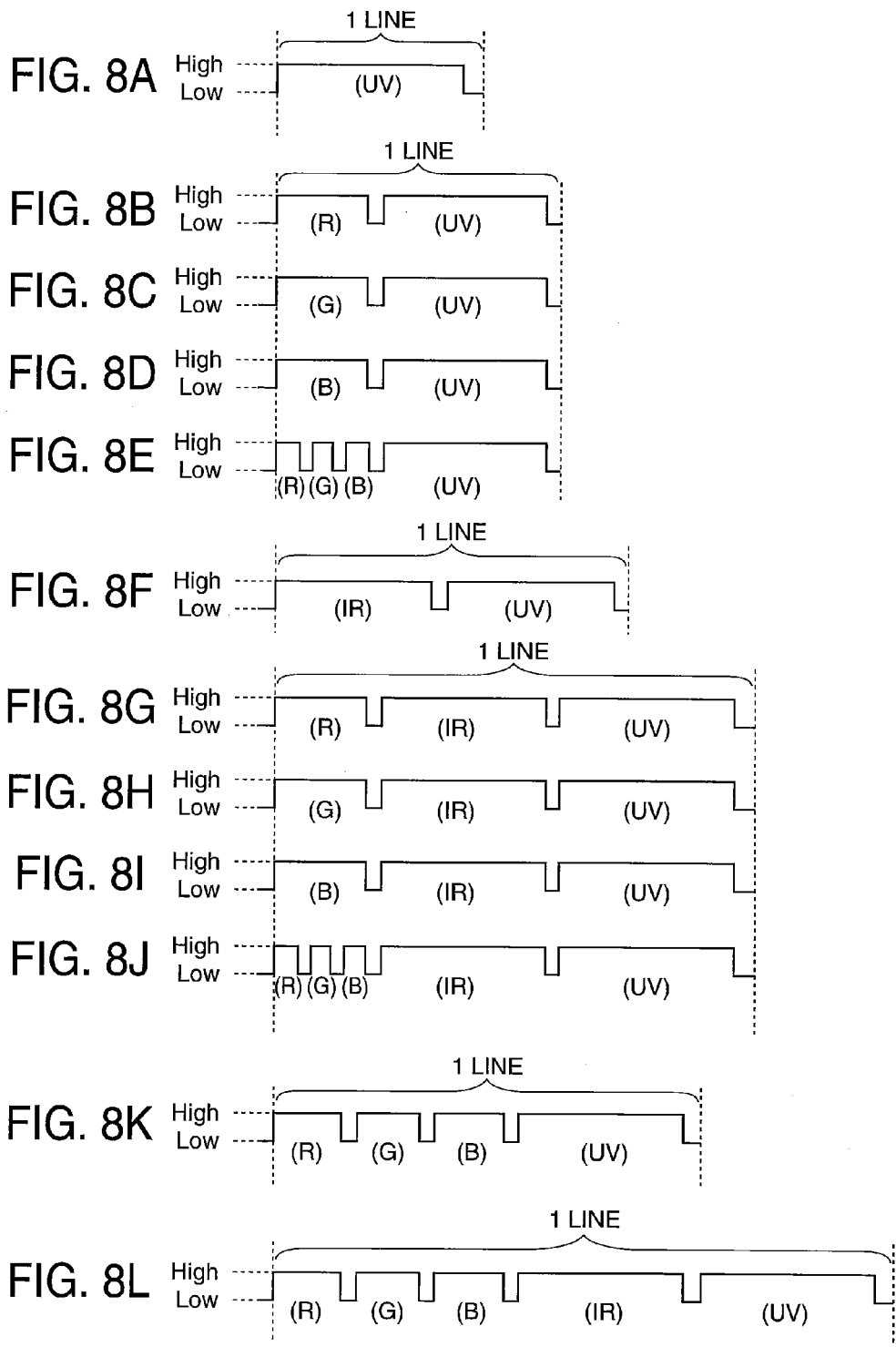

MEDIA PROCESSING DEVICE AND METHOD OF CONTROLLING A MEDIA PROCESSING DEVICE

CROSS REFERENCE TO RELATED APPLICATION

This application claims priority under 35 U.S.C. §119 to Japanese Patent Application No. 2011-207191 filed on Sep. 22, 2011, the entire disclosure of which is expressly incorporated by reference herein.

BACKGROUND

1. Technical Field

The present invention relates to a media processing device that conveys media such as checks through a conveyance path and acquires magnetic ink character data from magnetic ink characters printed on the media, and to a method of controlling the media processing device.

2. Related Art

Banks and other financial institutions commonly process transactions using checks, promissory notes, and similar instruments (simply "checks" below) by loading the presented checks in a check processing device and reading the magnetic ink characters printed on the checks to acquire check (payment) information. The check processing device described in Japanese Unexamined Patent Appl. Pub. JP-A-2011-160254 conveys checks through a conveyance path past the magnetic reading position of a magnetic head and the scanning position of an image scanner, reads the magnetic data from the magnetic ink characters at the magnetic reading position, images the face of the check on which the magnetic ink characters are printed at the scanning position, and recognizes the magnetic ink character data contained in the magnetic ink characters using the acquired magnetic data and scanned images.

Because the magnetic ink character data is used for transaction processing, accurately reading the magnetic ink character data from the magnetic ink characters printed on the media is essential.

Image scanners that can emit plural colors of light for image scanning have been proposed, but when such image scanners are used where these image scanners are typically used, it is difficult for the user to know how to improve the recognition rate of magnetic ink character data recognized from the magnetic ink characters.

SUMMARY

With consideration for this problem, a media processing device and a method of controlling a media processing device according to the present invention improve the recognition rate when recognizing magnetic ink character data carried in the magnetic ink characters from the magnetic ink characters printed on media without complicating operation for the user by incorporating an image scanning device that can emit infrared light.

To solve the foregoing problem, one aspect of the invention is a media processing device that can connect to a control device and includes: a media conveyance mechanism that conveys a medium having magnetic ink characters printed on the front past a magnetic reading position and a front scanning position; a magnetic reading unit that acquires magnetic data from the magnetic ink characters on the medium at the magnetic reading position; a front image scanner unit that can emit at least infrared light as the front image scanning light, and emits the front image scanning light to the front of the medium and acquires front image data at the front scanning position; and a control unit that, when at least a magnetic data read command is received from the control device, conveys the medium with the media conveyance mechanism, acquires the magnetic data with the magnetic reading unit, emits infrared light to the front of the medium and acquires first front image data with the front image scanner unit, and sends the magnetic data and the first front image data to the control device.

At least when a magnetic data read command to read magnetic ink characters is received from the control device, the media processing device in this aspect of the invention conveys the medium through the conveyance path, and acquires the magnetic data for the magnetic ink characters and first front image data using infrared light. Because the magnetic ink characters contain material, such as carbon, with high reflectivity to infrared light, the magnetic ink character data contained in the first front image data is optically recognized more easily than the magnetic ink character data contained in the normal image data acquired by emitting visible light. In addition, when a signature is written with a ballpoint pen, for example, on the side of the check or other medium where the magnetic ink characters are printed, the reflection from the signature is strong when exposed to visible light, and the reflection is weaker when the signature is exposed to infrared light. As a result, if the signature overlaps the magnetic ink characters, the magnetic ink characters can be difficult to identify in the front image data acquired by exposure to visible light because the signature is also reflected in the image data, but can be easily detected in the first front image data acquired by exposure to infrared light because the reflection of the signature is slight. As a result, the magnetic ink characters can be recognized with good precision by optical recognition using the first front image data on the control device side. Therefore, if the magnetic ink characters are recognized based on the acquired magnetic data and the first front image data, the recognition rate can be improved when recognizing the magnetic ink character data from the magnetic ink characters. The recognition rate of magnetic data can therefore be improved on the control device side in this aspect of the invention because first front image data that reduces the effect of signatures and other writing is automatically sent to the control device in addition to the magnetic data from the magnetic ink characters.

The magnetic data and first front image data can also be acquired and sent to the control device when both the magnetic data read command and a command to acquire the first front image data are received.

In another aspect of the invention, the front image scanner unit can emit visible light as the front image scanning light; and the control unit, when at least a front image scanning command to acquire the front image data is received from the control device, conveys the medium with the media conveyance mechanism, acquires the magnetic data with the magnetic reading unit, emits visible light and acquires second front image data with the front image scanner unit, emits infrared light and acquires the first front image data with the front image scanner unit, and sends the second front image data and the first front image data to the control device.

This embodiment acquires two images of the front, that is, first front image data acquired by emitting infrared light and second front image data acquired by emitting visible light, while the medium passes the front scanning position when at least a front image scanning command is received. Conveying the medium twice through the conveyance path and imaging the front twice, or scanning the front twice by reversing the medium after passing the image scanning position once, is therefore not necessary to acquire an image of the front of the medium (gray scale front image data or color image data) when the magnetic ink characters are recognized on the control device side.

If viewing the front image data on a display is desirable, the second front image data obtained with visible light is closer to what is seen naturally than the first front image data captured using infrared light. In addition to viewing the medium on the control device side, magnetic ink characters can be optically recognized from the first front image data captured with infrared light that removes the effect of signatures and other noise. The recognition rate can therefore be improved.

Visible front image scanning light includes red, green, and blue light alone, and red, green, and blue light sequentially emitted while the medium advances in specific scan line increments past the front scanning position.

The second front image data includes gray scale front image data acquired by emitting light of a single color; composite gray scale front image data acquired by sequentially emitting red, green, and blue light; and color front image data acquired by sequentially emitting red, green, and blue light.

If the gray scale front image data is acquired by emitting the front image scanning light of the same color as the ink used in the signature, for example, such as blue light when blue ink is used, front image data from which the effect of the blue signature is removed can also be acquired. More specifically, by appropriately selecting the front image scanning light, light of a specific color can be emitted to eliminate the effects of noise in the acquired front image data.

If both a scanning command specifying visible light and a scanning command specifying infrared light are received, both first front image data and second front image data can obviously be acquired and sent to the control device.

Checks that are printed with a specific image using ink with high reflectivity to UV light are also used to prevent forgery, for example. To determine if the check is authentic in this case, using an image scanner that can emit visible light, infrared light, and UV light for scanning checks is particularly effective.

When this type of image scanning device is used in a media processing device, the front image scanner unit can preferably emit ultraviolet light as the front image scanning light; and the control unit, when at least the magnetic data read command is received from the control device, conveys the medium with the media conveyance mechanism, acquires the magnetic data with the magnetic reading unit, emits ultraviolet light and acquires third front image data with the front image scanner unit, and sends the magnetic data and the third front image data to the control device.

When authentication data is printed on the medium in ink with high reflectivity to UV light, this aspect of the invention includes authentication data that can be easily recognized optically in the third front image data. Therefore, in addition to recognizing magnetic ink characters from the magnetic data, the authenticity of the medium can be easily determined based on the third front image data on the control device side.

When a magnetic data read command and a scanning command specifying UV light are both received, both the magnetic data and the third front image data can obviously be acquired and sent to the control device.

Further preferably in another aspect of the invention, the front image scanner unit can emit ultraviolet light as the front image scanning light; and the control unit, when at least the front image scanning command is received from the control device, conveys the medium with the media conveyance mechanism, emits visible light and acquires second front image data with the front image scanner unit, emits ultraviolet light and acquires third front image data with the front image scanner unit, and sends the second front image data and the third front image data to the control device.

When authentication data is printed on the medium in ink with high reflectivity to UV light, this aspect of the invention includes authentication data that can be easily recognized optically in the third front image data. Therefore, in addition to recognizing magnetic ink characters from the magnetic data, the authenticity of the medium can be easily determined based on the third front image data on the control device side.

When a scanning command specifying visible light and a scanning command specifying UV light are both received, both the second front image data and the third front image data can obviously be acquired and sent to the control device.

Further preferably a media processing device according to another aspect of the invention also has a magnetic data recognition unit that recognizes the magnetic ink characters based on the magnetic data; an image data recognition unit that optically recognizes the magnetic ink characters based on at least the first front image data; a data verification unit that confirms the magnetic ink characters based on at least the recognition result from the magnetic data recognition unit or the recognition result from the image data recognition unit; and a first data transmission unit that sends the magnetic ink characters confirmed by the data verification unit to the external device.

With this aspect of the invention the magnetic ink characters can be recognized on the media processing device side, and the magnetic ink character data can be accurately confirmed. In addition, the magnetic ink character data that is verified can be sent to the control device that supplied the magnetic data read command or front image scanning command.

Further preferably in another aspect of the invention, the data verification unit confirms the magnetic ink character data based on one or a combination of the magnetic data, the first front image data, the second front image data, and the third front image data. Using the third front image data, the authenticity of the check can also be confirmed. Because signatures and other noise can be removed using the first front image data, the magnetic ink character data is preferably confirmed using at least either or both the third front image data and the first front image data.

A media processing device according to another aspect of the invention also has a back scanning position disposed to the conveyance path; and a back image scanner unit that can emit at least infrared light as the back image scanning light, and emits the back image scanning light to the back of the conveyed medium and acquires back image data at the back scanning position. When at least a magnetic data read command is received from the control device, the control unit conveys the medium with the media conveyance mechanism, emits infrared light to the back of the medium and acquires first back image data with the back image scanner unit, and sends the first back image data with the magnetic data to the control device.

In addition to processing front image data, this aspect of the invention enables acquiring images of the back of the medium in different forms. Bank information preprinted on the back of a check, for example, can also be acquired in the back image data, and signatures and other information written on the back in ballpoint pen, for example, can be removed.

To acquire images of the back of the medium using an image scanning device that can emit UV light, the media processing device according to another aspect of the invention preferably has a back scanning position disposed to the conveyance path; and a back image scanner unit that can emit at least ultraviolet light as the back image scanning light, and emits the back image scanning light to the back of the conveyed medium and acquires back image data at the back scanning position. When at least a magnetic data read command is received from the control device, the control unit conveys the medium with the media conveyance mechanism, emits ultraviolet light to the back of the medium and acquires third back image data with the back image scanner unit, and sends the third back image data with the magnetic data to the control device.

In addition to processing front image data, this aspect of the invention enables acquiring images of the back of the medium in different forms. Furthermore, because some checks are printed with a specific image using ink with high reflectivity to UV light to prevent forgery, the back image data can be used to verify the authenticity of such media.

To acquire an image of the back of the medium using an image scanning device that can emit infrared light, visible light, and UV light, a media processing device according to another aspect of the invention preferably has a back scanning position disposed to the conveyance path; and a back image scanner unit that can emit infrared light, ultraviolet light, and visible light as the back image scanning light, and emits the back image scanning light to the back of the conveyed medium and acquires back image data at the back scanning position. Based on the received back image scanning command when a back image scanning command is received from the control device, the control unit acquires and sends to the control device back image data including at least one of the following group: (1) first back image data acquired as the back image data by exposing the back of the medium to infrared light, (2) second back image data acquired as the back image data by exposing the back of the medium to visible light, (3) third back image data acquired as the back image data by exposing the back of the medium to ultraviolet light, (4) the first back image data and the second back image data acquired as the back image data while the medium passes the back scanning position, (5) the first back image data and the third back image data acquired as the back image data while the medium passes the back scanning position, (6) the second back image data and the third back image data acquired as the back image data while the medium passes the back scanning position, and (7) the first back image data, the second back image data, and the third back image data acquired as the back image data while the medium passes the back scanning position.

In addition to processing front image data, this aspect of the invention enables acquiring images of the back of the medium in different forms. Visible back image scanning light includes red, green, and blue light alone, and red, green, and blue light sequentially emitted while the medium advances in specific scan line increments past the back scanning position. The back image data includes gray scale back image data acquired by emitting light of a single color; composite gray scale back image data acquired by sequentially emitting red, green, and blue light; and color back image data acquired by sequentially emitting red, green, and blue light.

Another aspect of the invention is a method of controlling a media processing device that can connect to a control device, including steps of conveying a medium having magnetic ink characters printed on the front past a magnetic reading unit and a front image scanner unit by a media conveyance mechanism, acquiring magnetic data from the magnetic ink characters with the magnetic reading unit, emitting infrared light to the front of the medium and acquiring front image data with the front image scanner unit, and sending the magnetic data and the first front image data to the control device, when at least a magnetic data read command is received from the control device.

When a magnetic data read command to read magnetic ink characters is received from the control device in this aspect of the invention, the media processing device acquires the magnetic data for the magnetic ink characters and first front image data using infrared light. Because the magnetic ink characters contain material, such as carbon, with high reflectivity to infrared light, the magnetic ink character data contained in the first front image data is optically recognized more easily than the magnetic ink character data contained in image data acquired by emitting visible light. In addition, when a signature is written with a ballpoint pen, for example, on the side of the check or other medium where the magnetic ink characters are printed, the reflection from the signature is strong when exposed to visible light, and the reflection is weaker when the signature is exposed to infrared light. As a result, if the signature overlaps the magnetic ink characters, the magnetic ink characters can be difficult to identify in the front image data acquired by exposure to visible light, but can be easily detected in the first front image data acquired by exposure to infrared light. As a result, the magnetic ink characters can be recognized with good precision by optical recognition using the first front image data. Therefore, if the magnetic ink characters are recognized based on the acquired magnetic data and the first front image data, the recognition rate can be improved when recognizing the magnetic ink character data from the magnetic ink characters.

Effect of the Invention

The media processing device according to the invention acquires magnetic data and first front image data using infrared light when at least a magnetic data read command is received. Because the magnetic ink character data contained in the first front image data is optically recognized more easily than the magnetic ink character data contained in the normal image data acquired by emitting visible light, the magnetic ink characters can be accurately recognized by optical character recognition using the magnetic data and first front image data. In addition, because image data acquired with infrared light and magnetic data are sent to the control device at least in response to a magnetic data read command, character recognition and authentication can be completed on the control device side without being affected by noise.

In addition, images of both the front and back sides of the medium can be acquired under different scanning conditions while also acquiring magnetic data when feeding the medium only once through the conveyance path.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 4 describes the image scanning modes that can be set for the front image scanner unit and the back image scanner unit.

FIG. 5 describes the drive signal of the light source in each image scanning mode shown in FIG. 4.

FIG. 8A-FIG. 8L describes the drive signal of the light source in each front image scanning mode shown in FIG. 7.

DESCRIPTION OF EMBODIMENTS

A preferred embodiment of a media processing device according to the invention is described below with reference to the accompanying figures. The media processing device according to this embodiment of the invention is a check processing device that processes checks. This check processing device has a check processing mechanism that reads magnetic data from magnetic ink characters printed on the check face and executes a transaction process, a card scanning mechanism for imaging driver licenses and similar cards for customer verification when processing checks, and a receipt printing mechanism for issuing receipts on which check processing (transaction) information, for example, is printed.

General Configuration

Figure 1:
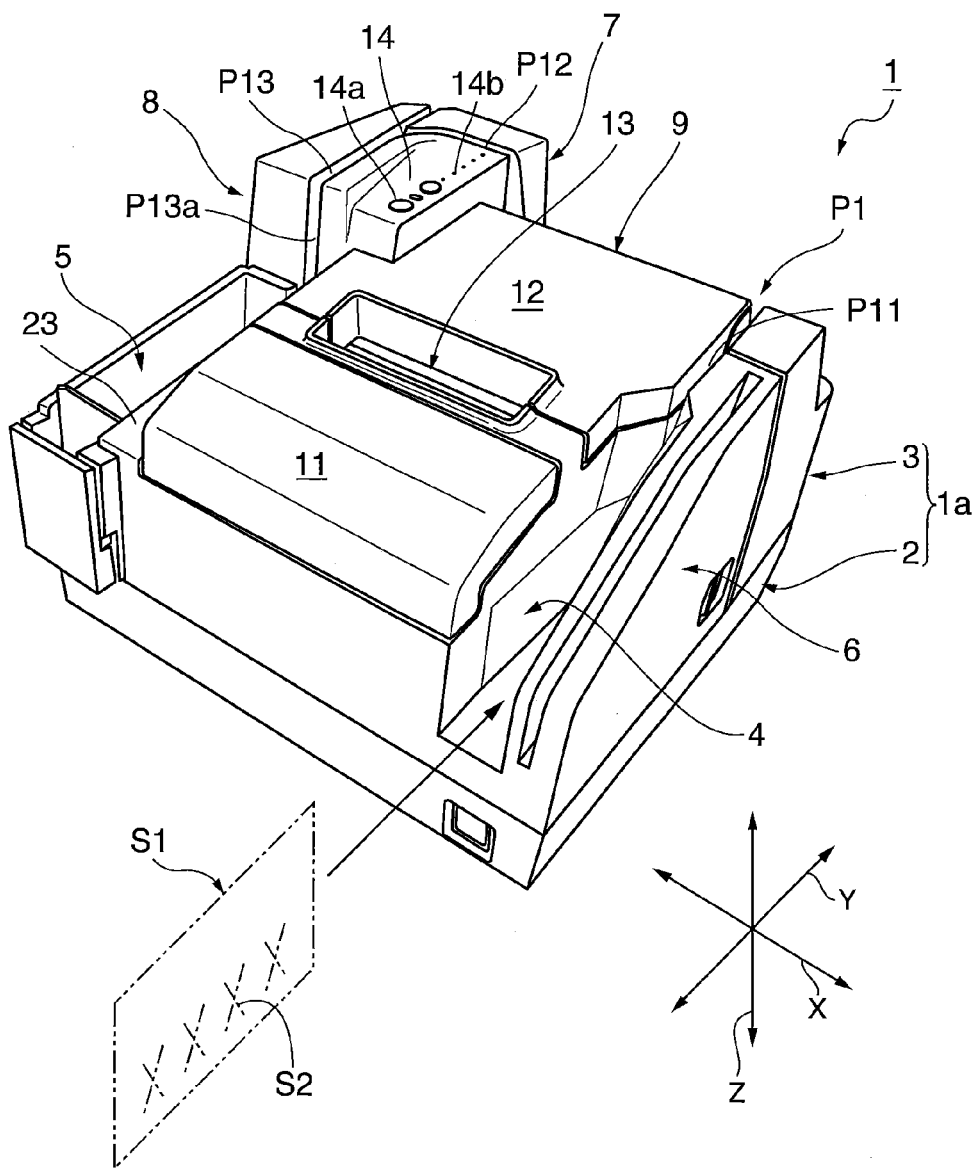
FIG. 1 is an oblique view showing a check processing device according a preferred embodiment of the invention.
Figure 2:
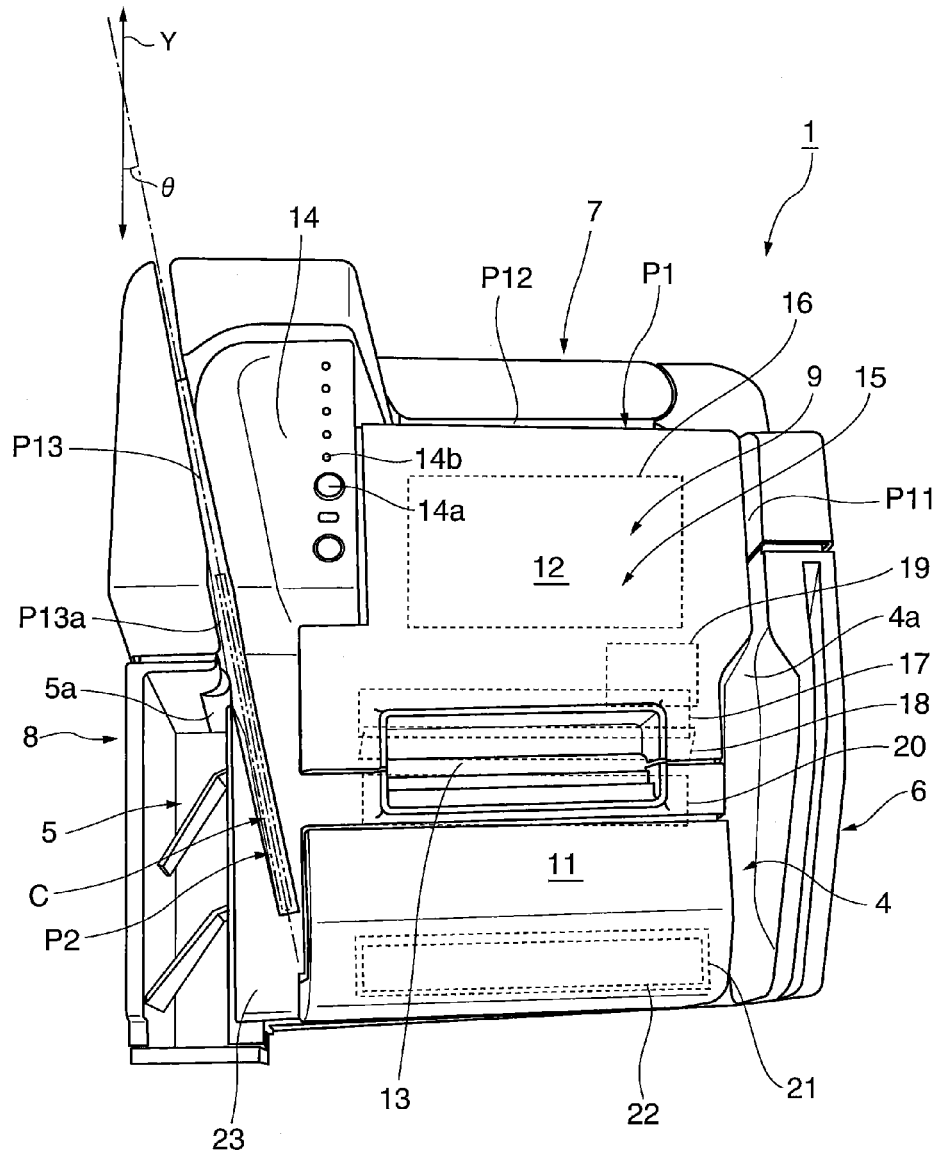
FIG. 2 is an oblique view of the check processing device shown in FIG. 1 when seen from above.

FIG. 1 is an oblique view of a check processing device according to a preferred embodiment of the invention from diagonally above the front right side. FIG. 2 is an oblique view of the check processing device from diagonally above the front.

As shown in FIG. 1 and FIG. 2, the case 1a of the check processing device 1 includes a rectangular bottom case part 2 of a specific thickness, and a top case part 3 disposed thereabove. An entry pocket 4 to which a check S1 to be processed is inserted, a check conveyance path P1 (first path) through which the check S1 fed from the entry pocket 4 is conveyed, and an exit pocket 5 for recovering the check S1 delivered from the check conveyance path P1, are formed in the top case part 3. While a check S1 is conveyed through the check conveyance path P1, this check processing device 1 can read the magnetic data in the magnetic ink characters S2 printed according to a standard such as E-13B or CMC-7 on the check S1, scan the front and back sides of the check S1, and print an endorsement on the check S1.

Note that when the check processing device 1 is placed in the normal upright operating position on a flat level surface as shown in FIG. 1, the side of the check processing device 1 (case 1a) facing the user is referred to below as the front, the opposite side as the back, the direction between this front and back is the longitudinal axis Y, the direction parallel to the level surface and perpendicular to the longitudinal axis Y is the transverse axis X, and the direction perpendicular to the level surface is the vertical axis Z.

The check conveyance path P1 from the entry pocket 4 through the check conveyance path P1 to the exit pocket 5 is a vertical channel of a specific width that is formed in the top case part 3 and open at the top on the vertical axis Z. As shown in FIG. 1, a check S1 is inserted to the entry pocket 4 standing on edge with the long sides at top and bottom, and is conveyed through the check conveyance path P1 and discharged into the exit pocket 5 in this same posture. The check conveyance path P1 is a substantially U-shaped path that opens to the front when seen in plan view.

More specifically, as will be understood from FIG. 2, the entry pocket 4 extends from the front toward the back of the top case part 3 on the right side of the transverse axis X, and the upstream path P11 portion of the check conveyance path P1 extends straight toward the back of the device from the check insertion opening 4a formed at the back end of the entry pocket 4. The downstream part of the upstream path portion P11 curves to the inside on the transverse axis X and joins the back path P12 portion of the check conveyance path P1. The back path P12 extends substantially straight on the transverse axis X, and the downstream end part thereof curves toward the front of the device and joins the downstream path P13 portion of the check conveyance path P1. The downstream path P13 is a straight path that is slanted an acute angle $\llcorner$ to the longitudinal axis Y to the inside of the device width, and in this embodiment of the invention continues at an angle of approximately 10 to 20 degrees. The downstream end of the downstream path P13 connects through a check discharge opening 5a to the exit pocket 5. The exit pocket 5 continues to the front of the device on the longitudinal axis Y.

The top case part 3 is divided by this U-shaped check conveyance path into a right case member 6, rear case member 7, left case member 8, and an inside case member 9 located thereinside. A front cover 11, a back cover 12, a receipt exit 13, and an operating panel 14 are disposed to the top of the inside case member 9.

The front cover 11 can open to the front pivoting on a position at the device front, and the back cover 12 can open to the back pivoting on a position at the device back. The receipt exit 13 is formed between the distal end of the front cover 11 and the distal end of the back cover 12, and has a narrow rectangular shape extending widthwise to the device. The operating panel 14 is a substantially flat surface formed at a place at the back side of the device on the left side of the back cover 12 at a slightly higher position, and has a plurality of operating switches 14a and a display unit 14b with a plurality of LEDs for indicating the operating status.

As shown in FIG. 2, a receipt printing unit 15 is disposed in the inside case member 9. This receipt printing unit 15 is a roll paper printer, and includes a roll paper compartment 16 in the area covered by the back cover 12. The roll paper compartment 16 holds the roll paper transversely so that it can rotate freely on its side, and the roll paper can be loaded or replaced by opening the back cover 12. The continuous paper (not shown in the figure) pulled from the paper roll in the roll paper compartment 16 is conveyed past the continuous paper printing position through the continuous paper conveyance path to the receipt exit 13. The continuous paper conveyance path extends to the front from the roll paper compartment 16 with the conveyance path width aligned with the width of the check processing device 1.

A line thermal printhead 17 and a platen roller 18 that conveys while pressing the continuous paper to the surface of the thermal printhead 17 are disposed to the continuous paper printing position. The receipt printing unit 15 also has a paper feed motor 19 that drives continuous paper conveyance, and drive power from the paper feed motor 19 is transmitted to the platen roller 18. An automatic cutter 20 for cutting the continuous paper widthwise is disposed to a part of the inside case member 9 covered by the front cover 11. Information corresponding to the check information is printed on the continuous paper delivered from the paper roller stored in the roll paper compartment 16, and the trailing end of the printed portion is cut to issue a receipt of a specific length from the receipt exit 13.

An ink cartridge holder 21 is disposed in front of the automatic cutter 20. An ink cartridge 22, which is an ink supply source for printing checks, is installed in the ink cartridge holder 21. When the front cover 11 is opened, the automatic cutter 20 drive unit is exposed and the top of the ink cartridge holder 21 is open, enabling inspecting the automatic cutter 20 and replacing the ink cartridge from the top of the check processing device 1.

As will be understood from FIG. 2, the card insertion path P2 is formed in the flat top part 23 on the left side of the front cover 11 in the top of the inside case member 9. This top part 23 is at a lower position than the operating panel 14 therebehind. The card insertion path P2 is a straight channel of a specific width and a specific depth that is open to the top in this top part 23. The rear end of the card insertion path P2 at the back of the device is connected to the top of the downstream end entrance P13a to the downstream path P13 portion of the check conveyance path P1, and the front end of the card insertion path P2 at the front side of the device is located near the side of the front cover 11. As will be understood from FIG. 3, the card insertion path P2 is a straight insertion path extending along an extension of the downstream path P13, which is a straight conveyance path, toward the device front. More specifically, the card insertion path P2 extends to the inside of the device in the direction slanted angle ⌊ to the longitudinal axis Y.

To scan an image of a card C, the card C is inserted to the card insertion path P2 from the device front and pushed to the back. The card C pushed into the card insertion path P2 is then conveyed from the card insertion path P2 through the downstream path P13, and is imaged by the front image scanner unit 25 and back image scanner unit 26 (see FIG. 3) described below disposed to the downstream path P13. The scanned card C is then conveyed from the downstream path P13 to the card insertion path P2.

Check Processing Mechanism

Figure 3:
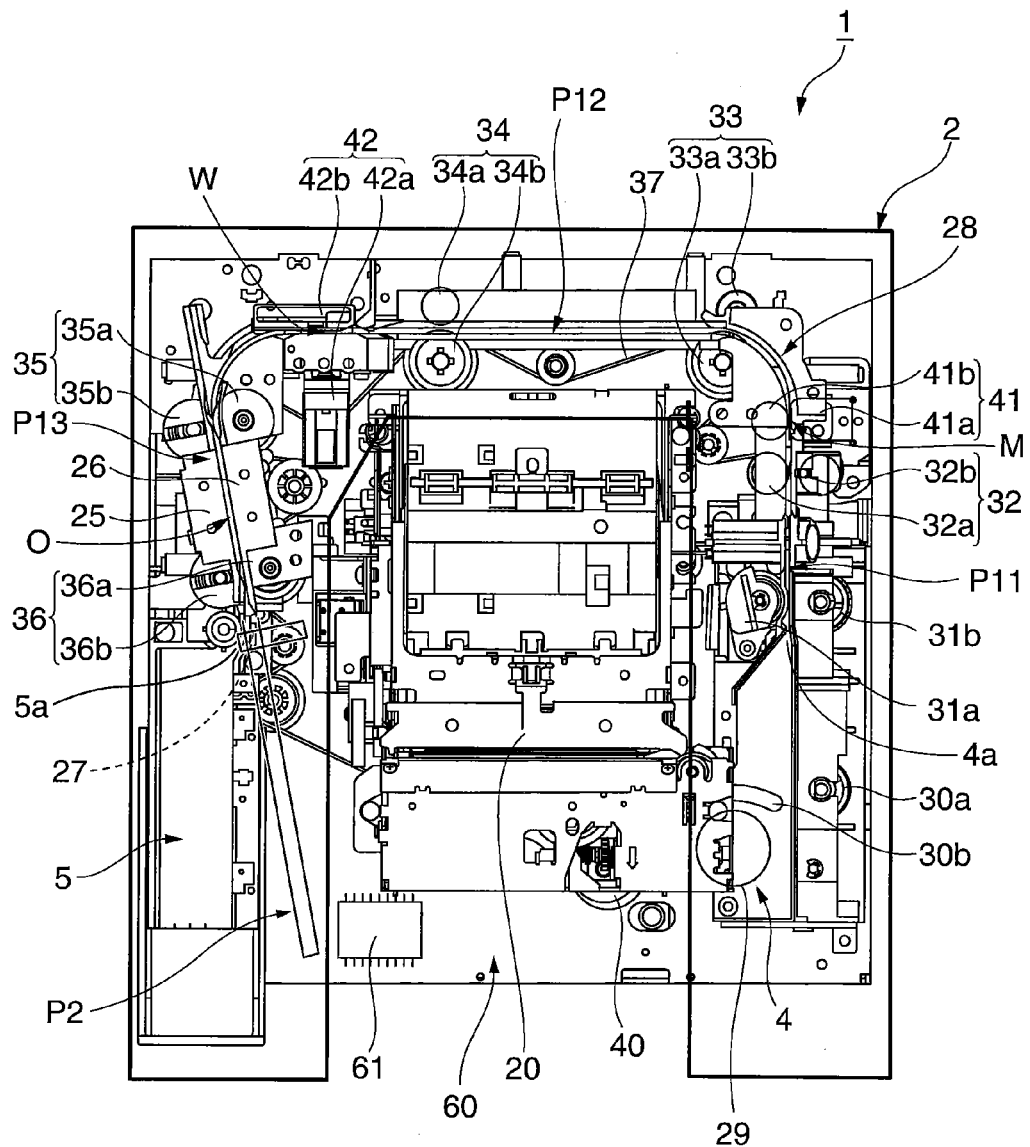
FIG. 3 shows the configuration of the check processing mechanism in the check processing device shown in FIG. 1.

FIG. 3 shows the main parts of the check processing mechanism. The check conveyance mechanism 28 for conveying a check S1 through the U-shaped check conveyance path P1 is described first. A paper feed roller 30a is disposed to the side on the right case member 6 side of the entry pocket 4, and a pressure member 30b is disposed to the side on the inside case member 9 side. The pressure member 30b pushes a check 51 inserted to the entry pocket 4 to the paper feed roller 30a side. The check 51 is fed into the upstream path P11 of the check conveyance path P1 by the paper feed roller 30a, which is driven by an in-feed motor 29. In this embodiment the check S1 is inserted standing on edge to the entry pocket 4 with the face on which the magnetic ink characters S2 are printed facing the outside of the device and the back of the check facing the inside (the inside case member 9 side).

A feed roller 31a that feeds the check 51 supplied from the entry pocket 4, and a retard roller 31b that faces the feed roller 31a with the upstream path P11 therebetween, are disposed to the upstream path P11 portion of the check conveyance path P1. The feed roller 31a is driven by the in-feed motor 29, and turns synchronously to the paper feed roller 30a. The retard roller 31b is urged to the feed roller 31a side, and separates and feeds the checks S1 one at a time downstream.

A plurality of conveyance roller pairs 32 to 36 are disposed to the conveyance path parts of the check conveyance path P1 downstream from the feed roller 31a. Conveyance roller pair 32 is disposed to the upstream path P11, conveyance roller pairs 33 and 34 are disposed to the back path P12, and the remaining conveyance roller pairs 35 and 36 are disposed to the downstream path P13. Each of the conveyance roller pairs 32 to 36 has a drive roller 32a, 33a, 34a, 35a, 36a on the inside case member 9 side, and a follower roller 32b, 33b, 34b, 35b, 36b on the outside right case member 6, rear case member 7, or left case member 8 side opposite the corresponding drive roller with the check conveyance path P1 therebetween. The drive rollers 32a, 33a, 34a, 35a, 36a are synchronously driven rotationally by a drive motor 40 through an endless belt 37. The follower rollers 32b, 33b, 34b, 35b, 36b are urged by an urging member not shown to the corresponding drive roller 32a-36a side.

A magnetic reading position M is disposed to the upstream path P11 of the check conveyance path P11. A magnetic reading unit 41 with a magnetic scanner 41a such as an MICR (magnetic ink character recognition) reader that can read the magnetic data of the magnetic ink characters S2 printed on the check 51 is disposed to the magnetic reading position M. The magnetic scanner 41a is disposed to the right case member 6 with the magnetic reading surface facing the upstream path P11. A pressure roller 41b is disposed opposite the magnetic reading surface of the magnetic scanner 41a with the upstream path P11 therebetween. The conveyed check 51 is pressed to the magnetic reading surface of the magnetic scanner 41a by the pressure roller 41b, and the magnetic data is read by the magnetic scanner 41a.

A printing position W is disposed to the back path P12, which extends continuously from the downstream end of the upstream path P11 widthwise to the device, in an area on the left corner side of the device. A check printing unit 42 that prints an endorsement on the back of the check S1 is disposed to the printing position W. The check printing unit 42 has an inkjet line head 42a disposed extending vertically to the device with the nozzle surface of the inkjet head 42a facing the back path P12. A platen 42b that determines the printing position W disposed to a place on the rear case member 7 facing the nozzle surface with the back path P12 therebetween. The ink supply source of the inkjet head 42a is the ink cartridge 22 loaded in the ink cartridge holder 21.

Conveyance roller pairs 35 and 36 are disposed to the downstream path P13 portion of the check conveyance path P1, and the image scanning position O is disposed to the conveyance path portion between the conveyance roller pairs 35, 36. The front image scanner unit 25 and back image scanner unit 26 are disposed to the image scanning position O facing each other with the downstream path P13 therebetween. The front image scanner unit 25 is disposed to the downstream path P13 facing the outside of the device, scans the face of the check 51 passing the image scanning position O, and acquires an image of the check face. The back image scanner unit 26 is disposed to the downstream path P13 facing the inside of the device, scans the back of the check 51 passing the image scanning position O, and acquires an image of the back of the check.

The downstream end of the downstream path P13 is connected to the check discharge opening 5a that discharges the processed check 51 after reading magnetic data, printing an endorsement, and imaging are completed into the exit pocket 5. The exit pocket 5 is open at the top, and a check 51 deposited into the exit pocket 5 can be removed from above. Because both the entry pocket 4 and exit pocket 5 are open at the top, the operator can always handle checks 51 from above the front of the check processing device 1.

Card Scanning Mechanism

A card scanning mechanism images cards C inserted from the card insertion path P2. As shown in FIG. 3, the card scanning mechanism includes the card insertion path P2, and a card sensor 27 that detects a card C inserted to the card insertion path P2. The card sensor 27 could be a photocoupler or other optical sensor, a mechanical switch, or other device.

When insertion of a card C to the card insertion path P2 is detected by the card sensor 27, the conveyance roller pairs 35, 36 of the check processing mechanism disposed to the downstream path P13 turn, and a card in-feed operation that conveys the card C inserted from the card insertion path P2 through the downstream path P13 to the back side of the device, and a card out-feed operation that conveys and returns the in-fed card C to the device front into the card insertion path P2, are performed. A card scanning operation that images the front and back sides of the card C using the front image scanner unit 25 and back image scanner unit 26 for scanning checks S1 is performed when the card C fed from the downstream path P13 to the card insertion path P2 passes the image scanning position O. Front image scanner unit and back image scanner unit The front image scanner unit 25 and back image scanner unit 26 are both contact image sensor (CIS) modules that emit scanning light (front scanning light and back scanning light) from respective light sources, capture the reflection of the scanning light from the check 51 with image the image sensors, and acquire images (front image information and back image information) of the scanned medium.

The light source of the front scanning light of the front image scanner unit 25 is a compound light source having a red LED(R) that emits red light, a green LED(G) that emits green light, a blue LED(B) that emits blue light, and an infrared LED(IR) that emits infrared light. Each LED can be controlled to emit independently. The reading unit may be a photodiode, phototransistor, CCD line sensor, or CMOS line sensor, has greater width (height) than the width (height) of the check S1 conveyed through the check conveyance path P1, and extends vertically. The front image scanner unit 25 and back image scanner unit 26 are both disposed with the sensor surface facing the back path P12.

FIG. 4 describes the image scanning modes that can be set for the front image scanner unit 25 and back image scanner unit 26. As shown in FIG. 4, the front image scanner unit 25 can select which of the LEDs (R), (G), (B) emit, whether the captured image is gray scale or color, and whether or not to capture a gray scale image of the check face with infrared light in addition to the gray scale or color image of the check face captured with visible light, and has front image scanning modes 1 to 11 with different combinations of these selections. In FIG. 5, (a) to (k) describe the LED drive signals in each front image scanning modes 1 to 11. When the signal level of the drive signal is HIGH in FIG. 5(a) to (k), the corresponding LED is on and emits the front scanning light.

In front image scanning modes 1 to 3 in FIG. 4, the front image scanner unit 25 causes one LED in the red LED(R), green LED(G), and blue LED(B) group to emit during period (t1), which is the time required to convey the check S1 one line past the image scanning position O at a speed determined by the scanning resolution, as shown in FIG. 5(a) to (c). As a result, the scanner unit acquires a gray scale image of the check face obtained by emitting a single color of visible light (light of a single color, red, green, or blue).

As shown in FIG. 5(d), in front image scanning mode 4 the front image scanner unit 25 causes the red LED(R), green LED(G), and blue LED(B) to emit sequentially during the time (t1) required for the check S1 to move one line past the image scanning position O. As a result, the scanner unit acquires a gray scale (composite gray) image of the check face obtained by emitting visible light (red, green, and blue light).

In front image scanning mode 5 (first front image scanning mode) as shown in FIG. 5(e), the front image scanner unit 25 causes the infrared LED(IR) to emit during the time (t2) required for the check S1 to move one line past the image scanning position O. As a result, the scanner unit acquires a gray scale image of the check face obtained by emitting infrared light. Note that in front image scanning mode 5, the time (t2) required for the check S1 to move one line past the image scanning position O is longer than the time (t1) required for the check S1 to move one line past the image scanning position O in front image scanning modes 1 to 4. More specifically, because more time is required for imaging when using infrared light than when using visible light to scan, conveyance speed 2 of checks S1 in front image scanning mode 5 is slower than conveyance speed 1 of checks S1 in front image scanning modes 1 to 4.

In front image scanning modes 6 to 8 (second image scanning mode) in FIG. 4 as shown in FIG. 5(f) to (h), the front image scanner unit 25 causes one LED in the red LED(R), green LED(G), and blue LED(B) group, and the infrared LED(IR), to emit sequentially during the time (t3) required to convey the check S1 one line past the image scanning position O. As a result, the scanner unit acquires a gray scale image of the check face obtained by emitting a single color of visible light (a single color of light, red, green, or blue), and a gray scale image of the check face obtained by emitting infrared light.

In front image scanning mode 9 in FIG. 4 as shown in FIG. 5(i), the front image scanner unit 25 causes the red LED(R), green LED(G), blue LED(B), and infrared LED(IR) to emit sequentially during the time (t3) required for the check S1 to move one line past the image scanning position O. As a result, the scanner unit acquires a gray scale (composite gray) image of the check face obtained by emitting visible light (red, green, and blue light), and a gray scale image of the check face obtained by emitting infrared light.

In front image scanning mode 10 in FIG. 4 as shown in FIG. 5(j), the front image scanner unit 25 causes the red LED(R), green LED(G), and blue LED(B) to emit sequentially during the time (t3) required for the check S1 to move one line past the image scanning position O. As a result, the scanner unit acquires a color image of the check face.

In this embodiment the color image of the check face acquired in front image scanning mode 10 is a 24-bit color image, and the composite gray scale images of the check face acquired in front image scanning mode 4 and front image scanning mode 9 are 8-bit gray scale images.

In front image scanning modes 6 to 10, the time (t3) required for the check S1 to move one line past the image scanning position O is longer than the time (t1) required for the check S1 to move one line past the image scanning position O in front image scanning modes 1 to 4, and longer than the time (t2) required for the check S1 to move one line past the image scanning position O in front image scanning mode 5. More specifically, conveyance speed 3 of checks S1 in front image scanning modes 6 to 10 is slower than conveyance speed 1 and conveyance speed 2 of checks S1 in front image scanning modes 1 to 5. In this embodiment conveyance speed 3 of checks S1 in front image scanning modes 6 to 10 is ½ the conveyance speed 1 of checks S1 in front image scanning modes 1 to 4.

In front image scanning mode 11 (second image scanning mode) in FIG. 4 as shown in FIG. 5(k), the front image scanner unit 25 causes the red LED(R), green LED(G), blue LED(B), and infrared LED(IR) to emit sequentially during the time (t4) required for the check S1 to move one line past the image scanning position O. As a result, the scanner unit acquires a color image of the check face and a gray scale image of the check face from the infrared light.

In front image scanning mode 11, the time (t4) required for the check S1 to move one line past the image scanning position O is longer than the time (t1) required for the check S1 to move one line past the image scanning position O in front image scanning modes 1 to 4, the time (t2) required for the check S1 to move one line past the image scanning position O in front image scanning mode 5, and the time (t3) required for the check S1 to move one line past the image scanning position O in front image scanning modes 6 to 10. More specifically, conveyance speed 4 of checks S1 in front image scanning mode 11 is slower than conveyance speed 1, conveyance speed 2, and conveyance speed 3 of checks S1 in front image scanning modes 1 to 10. In this embodiment conveyance speed 4 of checks S1 in front image scanning mode 11 is ⅓ the conveyance speed 1 of checks S1 in front image scanning modes 1 to 4.

The back image scanner unit 26 is configured identically to the front image scanner unit 25. The back image scanner unit 26 therefore also has the same back image scanning modes 1 to 11 as the front image scanning modes of the front image scanner unit 25 as shown in FIG. 4. The front image scanner unit 25 and back image scanner unit 26 in this embodiment can also scan the front and back sides of the check S1 passing the image scanning position O in different front and back image scanning modes at the same time. As a result, there are 121 different image scanning patterns that can be used to image the front and back sides of the check S1 passing the image scanning position O as shown in FIG. 4.

In addition, because one of three possible image scanning resolutions can be selectively set in each of the front and back image scanning modes 1 to 11 that can be set for the front image scanner unit 25 and back image scanner unit 26, the front and back sides of a check S1 passing the image scanning position O can actually be imaged in (121×3) different scanning patterns.

When different scanning modes are set for the front image scanner unit 25 and back image scanner unit 26, and the conveyance speeds of the front image scanning mode of the front image scanner unit 25 and the back image scanning mode of the back image scanner unit 26 are different, the check S1 is conveyed at the conveyance speed of the image scanning mode with the slower conveyance speed.

When the front image scanner unit 25 or the back image scanner unit 26 is set to a color scanning mode and the other is set to a gray scale mode (composite gray scale mode by emitting red, green, and blue light) using visible light (the situation flagged as note 1 in FIG. 4), the other scanner unit set to the gray scale (composite gray scale) mode also captures a color image. Because gray scale (composite gray scale) image data is also contained in color image data, a gray scale (composite gray scale) image can also be obtained by processing the color image data.

Check Processing Device Control System

Figures 6, 7:
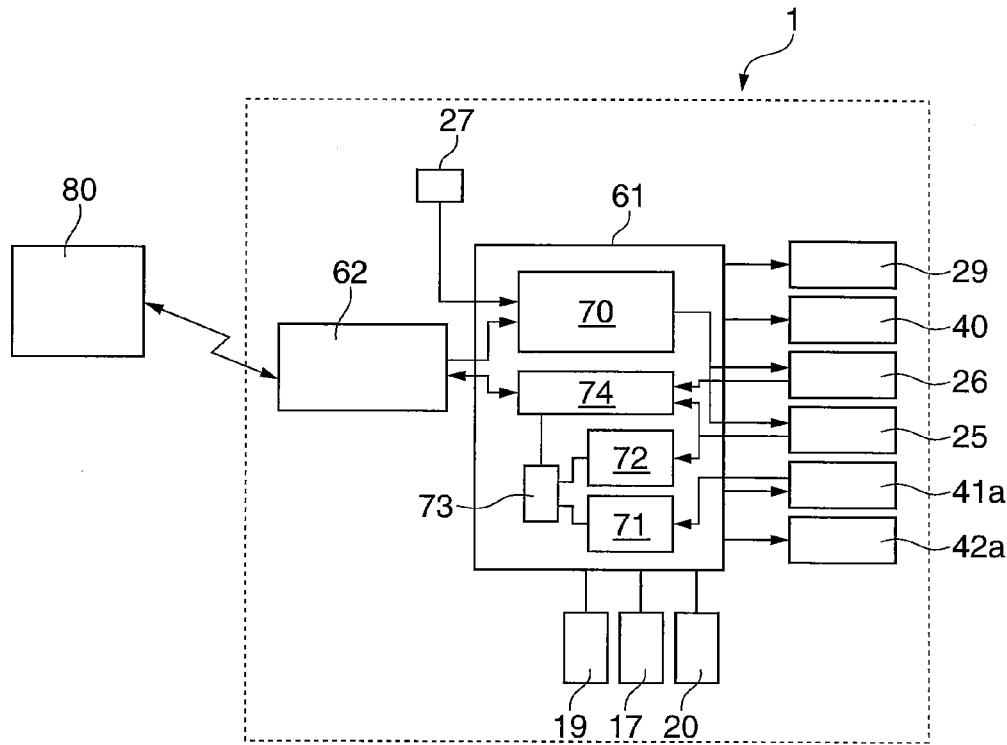
FIG. 6 is a block diagram of the control system of the check processing device.
FIG. 7 describes the front image scanning modes that can be set for the front image scanner unit in another embodiment of the invention.

FIG. 6 is a block diagram of the control system of the check processing device 1. Operation of the check processing device 1 is controlled by a control unit 61 such as an MPU. As shown in FIG. 3, the control unit 61 is mounted on a circuit board 60 disposed to the top of the bottom case part 2. A communication unit 62 with a communication interface for communicating with a computer 80 (external device) is connected to the control unit 61. The card sensor 27 is connected to the input side of the control unit 61. The in-feed motor 29, drive motor 40, magnetic scanner 41a, inkjet head 42a, front image scanner unit 25, and back image scanner unit 26 of the check processing mechanism are connected to the output side of the control unit 61 through respective drivers (not shown in the figure). The paper feed motor 19, thermal printhead 17, and automatic cutter 20 of the receipt printing unit 15 are also connected to the output side of the control unit 61 through respective drivers (not shown in the figure).

The control unit 61 includes an image scanning mode setting unit 70, magnetic data recognition unit 71, image data recognition unit 72, data checking unit 73, and data transmission unit (first data transmission unit, second data transmission unit) 74.

The image scanning mode setting unit 70 sets the front image scanning mode of the front image scanner unit 25 and the back image scanning mode of the back image scanner unit 26 based on control commands sent from the computer 80 through the communication unit 62.

When a magnetic ink character read command (magnetic data read command) to read the magnetic ink characters S2 is received from the computer 80, for example, the image scanning mode setting unit 70 sets the front image scanner unit 25 to front image scanning mode 5 (first front image scanning mode) to emit infrared light as the front image scanning light and acquire a gray scale image of the check face (first front image data).

When a front image scanning command to acquire an image of the front (front image data) is received with the magnetic ink character read command from the computer 80, for example, the image scanning mode setting unit 70 sets the front image scanner unit 25 to front image scanning mode 11 (second image scanning mode) to capture a color image of the front by emitting visible light (red, green, and blue light) (second front image data) and a gray scale image of the front by emitting infrared light (first front image data) as the front image information while the check S1 is conveyed past the image scanning position O.

When a back image scanning command to acquire an image of the back (back image data) is received from the computer 80, for example, the image scanning mode setting unit 70 sets the back image scanning mode of the back image scanner unit 26 to one of back image scanning modes 1 to 11 based on the back image scanning command. For example, if the back image scanning command is a back image scanning command to acquire a gray scale image by emitting visible light (red, green, and blue light), the back image scanner unit 26 is set to back image scanning mode 4.

When the control unit 61 detects insertion of a card C to the card insertion path P2 based on output from the card sensor 27, the image scanning mode setting unit 70 sets the front image scanning mode of the front image scanner unit 25 and the back image scanning mode of the back image scanner unit 26. In this example, the image scanning mode setting unit 70 sets the front image scanner unit 25 to the front image scanning mode 10 to acquire a color image of the front by emitting visible light (red, green, and blue light), and sets the back image scanner unit 26 to back image scanning mode 10 to acquire a color image of the back by emitting visible light (red, green, and blue light).

The magnetic data recognition unit 71 then recognizes the magnetic ink characters S2 based on the magnetic data acquired by the magnetic reading unit 41. More specifically, the magnetic data (detection signal) acquired by the magnetic reading unit 41 is compared with previously stored signal patterns for the magnetic ink characters S2 to recognize the magnetic ink characters S2. The image data recognition unit 72 is an optical character reader (OCR) device that optically recognizes the magnetic ink characters S2 from the front image data acquired by the front image scanner unit 25.

The data checking unit 73 then confirms the magnetic ink character data of the magnetic ink characters S2 based on the magnetic ink characters S2 recognition results from the magnetic data recognition unit 71 and the magnetic ink characters S2 recognition results from the image data recognition unit 72. For example, if the recognition results of the magnetic data recognition unit 71 and image data recognition unit 72 are the same, the recognition results are confirmed as the magnetic ink character data. If part of the magnetic ink characters S2 cannot be recognized by either the magnetic data recognition unit 71 or image data recognition unit 72, the data for the unrecognized part is corrected based on the recognition result from the other recognition unit to confirm the magnetic ink character data.

The data transmission unit 74 sends the magnetic data acquired by the magnetic reading unit 41, the front image data acquired by the front image scanner unit 25, and the back image data acquired by the back image scanner unit 26 through the communication unit 62 to the computer 80 based on the magnetic ink character read command or other command received from the computer 80. For example, if the received control command is a magnetic ink character read command, the front image data and back image data is added (linked) to the magnetic data and sent to the computer 80. Alternatively, if the control command is a magnetic ink character read command, the front image data acquired by the front image scanner unit 25 and the back image data acquired by the back image scanner unit 26 is added (linked) to the magnetic ink character data confirmed by the data checking unit 73, and sent to the computer 80.

The computer 80 in this embodiment also has a magnetic data recognition unit 71, image data recognition unit 72, and data checking unit 73 identically to the check processing device 1. As a result, when the magnetic data acquired by the magnetic reading unit 41, and the front image data acquired by the front image scanner unit 25, are sent from the data transmission unit 74 to the computer 80, the computer 80 can recognize the magnetic ink characters S2 printed on the check S1.

Operation of the Check Processing Device

The check processing device 1 is used connected to a computer 80 (control device) that can communicate with the transaction system of a bank or other financial institution. When a check S1 is inserted to the entry pocket 4 of the check processing device 1 and a transaction process command is sent from the computer 80 to the check processing device 1, the control unit 61 first sets the image scanning modes of the front image scanner unit 25 and back image scanner unit 26. Because a magnetic ink character read command, front image scanning command, and back image scanning command are contained in the transaction process command, the image scanning mode setting unit 70 sets the front image scanner unit 25 to front image scanning mode 11, and sets the back image scanner unit 26 to back image scanning mode 4.

Next, the control unit 61 starts conveying a check S1 with the check conveyance mechanism 28. More specifically, the control unit 61 controls driving the in-feed motor 29 of the check processing mechanism to feed a check S1 into the check conveyance path P1 with the paper feed roller 30a. At the same time, the control unit 61 controls driving the drive motor 40 to convey the checks S1 one at a time through the upstream path P11 with the feed roller 31a and retard roller 31b.

While the check S1 conveyed through the upstream path P11 passes the magnetic reading position M, the control unit 61 controls the magnetic reading unit 41 to read the magnetic data from the magnetic ink characters S2 on the check S1 and acquires the magnetic data.

While the check S1 conveyed through the upstream path P11 passes the image scanning position O, the control unit 61 controls driving the front image scanner unit 25 to acquire a color image of the front by emitting visible light (red, green, and blue light) and gray scale image of the front by emitting infrared light as the front image data, and controls driving the back image scanner unit 26 to acquire a gray scale image of the back by emitting visible light (red, green, and blue light) as the back image data. The control unit 61 then stops check S1 conveyance.

Once the magnetic data, front image data, and back image data are acquired, the data transmission unit 74 adds the front image data and back image data to the magnetic data and sends the data to the computer 80.

The computer 80 then recognizes the magnetic ink characters S2 based on the magnetic data, and optically recognizes the magnetic ink characters S2 from the gray scale image of the front obtained by emitting infrared light. The computer 80 then confirms the magnetic ink character data contained in the magnetic ink characters S2 based on the result of recognizing the magnetic ink characters S2 based on the magnetic data and the result of recognizing the magnetic ink characters S2 from the image data. If the magnetic ink character data is confirmed, the computer 80 communicates with the transaction system of the bank to process the transaction, stores the front image data and back image data supplied from the check processing device 1 linked to the magnetic ink character data as proof of the completed transaction process, and sends a complete transaction command including transaction process information describing the content of the transaction and information indicating that the transaction process was completed to the check processing device 1.

When the complete transaction command is received from the computer 80, the control unit 61 controls driving the check conveyance mechanism 28 to convey the check S1 to the magnetic reading position M side of the printing position W, and then conveys the check S1 toward the image scanning position O side to pass the printing position W again and print an endorsement on the back of the check S1. When endorsement printing is completed, the check S1 is discharged by the discharge conveyance roller pair 36 into the exit pocket 5.

The control unit 61 also controls the paper feed motor 19 of the receipt printing unit 15 to turn the platen roller 18, feed continuous paper from the paper roll, and print the transaction process information on the continuous paper with the thermal printhead 17. The printed continuous paper is discharged from the receipt exit 13 to the outside of the device. When the trailing end of the printed portion reaches the cutting position of the automatic cutter 20, the automatic cutter 20 is driven by the control unit 61, and the printed portion of the continuous paper is cut widthwise and severed from the paper roll. The printed sheet that is cut to a certain length is then issued as a receipt.

When insertion of a card C to the card insertion path P2 is detected by the control unit 61 based on output from the card sensor 27, the image scanning mode setting unit 70 sets the image scanning modes of the front image scanner unit 25 and back image scanner unit 26. In this example the image scanning mode setting unit 70 sets the front image scanner unit 25 to front image scanning mode 10, and sets the back image scanner unit 26 to back image scanning mode 10.

The control unit 61 then controls driving the drive motor 40 of the check conveyance mechanism 28 and drives the check conveyance roller pairs 35, 36 in the card conveyance operation that conveys the card C inserted to the card insertion path P2 to the downstream path P13. The length of the card C in the conveyance direction is also detected based on output from the card sensor 27 during this card conveyance operation.

The control unit 61 ends the card conveyance operation when the trailing end of the card C in the conveyance direction passes the image scanning position O, and then drives the conveyance roller pairs 35, 36 to rotate in reverse and starts the card out-feed operation that discharges the card C. During this card out-feed operation the control unit 61 drives the front image scanner unit 25 and back image scanner unit 26 to image the front and back sides of the card C passing the image scanning position O. As a result, a color image of the card front is obtained as the front image data by emitting visible light, and a color image of the card back is obtained as the back image data by emitting visible light. When the trailing end of the card C in the out-feed direction is detected by the card sensor 27, the card C is conveyed a specific distance and the card out-feed operation then ends. The front image data and back image data acquired as front and back images of the card C is sent by the data transmission unit 74 to the computer 80.

Note that recognizing the magnetic ink characters S2 can be done on the check processing device 1 side when the magnetic data, front image data, and back image data have been acquired. In this case, the magnetic data recognition unit 71 recognizes the magnetic ink characters S2 based on the magnetic data once the magnetic data is acquired. Once the front image data and back image data are acquired, the image data recognition unit 72 optically recognizes the magnetic ink characters S2 from the gray scale image of the front by emitting infrared light. Once the magnetic ink characters S2 are recognized by the image data recognition unit 72, the data checking unit 73 verifies the magnetic ink character data from the magnetic ink characters S2 based on the result of the magnetic data recognition unit 71 recognizing the magnetic ink characters S2 and the result of the image data recognition unit 72 recognizing the magnetic ink characters S2. The magnetic ink character data confirmed by the data checking unit 73 is then sent by the data transmission unit 74 to the computer 80 together with the front image data acquired by the front image scanner unit 25 (gray scale image of the front obtained by emitting visible light, and gray scale image of the front by emitting infrared light), and the back image data acquired by the back image scanner unit 26 (color image of the back obtained by emitting visible light).

Operating Effect

When a magnetic ink character read command (magnetic data read command) to read the magnetic ink characters S2 is received from the computer 80, the check processing device 1 conveys the check S1 through the check conveyance path P1, acquires the magnetic data of the magnetic ink characters S2 at the magnetic reading position M, and acquires an image of the check face by emitting infrared light at the image scanning position O. Because the magnetic ink characters S2 contain material, such as carbon, with high reflectivity to infrared light, the information about the magnetic ink characters S2 contained in the front image data is optically recognized more easily than the magnetic ink characters S2 information contained in the normal image data acquired by emitting visible light. In addition, when a signature is written with a ballpoint pen, for example, on the side of the check S1 where the magnetic ink characters S2 are printed, the reflection of the signature is strong when exposed to visible light, and the reflection is weaker when the signature is exposed to infrared light. As a result, if the signature overlaps the magnetic ink characters S2, the magnetic ink characters S2 can be difficult to identify in the front image data acquired by exposure to visible light, but can be easily detected in the front image data acquired by exposure to infrared light. As a result, the magnetic ink characters S2 can be recognized with good precision by optical recognition using the front image data acquired with infrared light. Therefore, if the magnetic ink characters S2 are recognized based on the acquired magnetic data and the front image data acquired by emitting infrared light, the recognition rate can be improved when recognizing the magnetic ink character data from the magnetic ink characters S2.

This embodiment acquires two images of the front, that is, image data acquired by emitting infrared light and image data acquired by emitting visible light, while the check S1 passes the image scanning position O. Conveying the check S1 twice through the check conveyance path P1 and imaging the front twice, or scanning the front twice by reversing the check S1 after passing the image scanning position O, is therefore not necessary to acquire an image of the check S1 front (gray scale or color image) when the magnetic ink characters are read.

Because the second front image data obtained with visible light is close to the image seen by the eye, the computer 80 can display the front image on a display for visual confirmation if two images of the front are acquired, a front image acquired with infrared light and a front image acquired with visible light. The front image of the check S1 can therefore be visually checked on the computer 80 side while the magnetic ink characters S2 can be optically recognized based on front image data from which the effect of a signature written with a ballpoint pen has been removed, and the recognition rate can be improved.

If a signature was written with a ballpoint pen on the front of the check S1, and the front image scanning mode is set to acquire a gray scale image by emitting light of the same color as the ink used in the signature when front image data is acquired by emitting visible light, the effect of the signature can be removed from the acquired front image data. For example, if the signature is written in blue ink, and the image scanning mode setting unit 70 sets the front image scanner unit 25 to front image scanning mode 3 to acquire a gray scale image of the front by emitting blue light, the effect of the blue signature can be removed from the acquired front image data. More specifically, information that becomes noise can be removed from the acquired front image data by selecting a particular color of light to scan the check.

The check processing device in this embodiment of the invention has a magnetic data recognition unit 71 that recognizes magnetic ink characters S2 based on magnetic data; a image data recognition unit 72 that optically recognizes the magnetic ink characters S2 based on front image data acquired with infrared light; a data checking unit 73 that confirms the magnetic ink character data contained in the magnetic ink characters S2 based on the recognition result of the magnetic data recognition unit 71 and the recognition result of the image data recognition unit 72; and a data transmission unit 74 that sends the magnetic ink character data confirmed by the data checking unit 73, the front image data acquired by the front image scanner unit 25, and the back image data acquired by the back image scanner unit 26 to the computer 80. The magnetic ink characters S2 can therefore be accurately recognized on the check processing device 1 side. In addition, the magnetic ink character data recognized from the magnetic ink characters S2, the front image data, and the back image data can be supplied to the computer 80 that sent the magnetic ink character read command.

This embodiment of the invention enables setting the back image scanning mode of the back image scanner unit 26 separately from the front image scanning mode of the front image scanner unit 25, and can acquire images of the front and back sides of the check S1 using different scanning modes. As a result, front and back images of the check S1 can be acquired in a wide range of scanning patterns. As a result, bank information, for example, that is preprinted on the check S1 can be acquired as front image data while signatures and other information written with a ballpoint pen, for example, can be removed.

The front image scanner unit 25 is set to the front image scanning mode 5 when a magnetic ink character read command is received from the computer 80 in the above embodiment, and the front image scanner unit 25 is set to front image scanning mode 11 when a front image scanning command to acquire front image data is acquired together with the magnetic ink character read command. However, the magnetic ink character S2 recognition rate can be improved based on the front image data acquired by the front image scanner unit 25 if the front image scanner unit 25 is set to any front image scanning mode that can at least acquire front image data by emitting infrared light when either one of these control commands is received. In addition, when a gray scale image of the front is acquired by emitting infrared light, only the infrared light gray scale image is sent to the computer 80 when a front image scanning command is received, but when a magnetic ink character read command is received, the infrared light gray scale image is sent with the magnetic data for the magnetic ink characters S2 on the check S1 to the computer 80.

Variation 1

A front image scanner unit that has a red LED(R) that emits red light, a green LED(G) that emits green light, a blue LED (B) that emits blue light, an infrared LED(IR) that emits infrared light, and an ultraviolet LED(UV) that emits ultraviolet light as the light source of the front scanning light, and can independently control each LED to emit, can be used instead of the front image scanner unit 25 described above. By also being able to acquire front image data by emitting UV light from the front image scanner unit, the image scanning mode setting unit 70 in the check processing device with the front image scanner unit according to this embodiment of the invention can set the front image scanner unit to a larger number of front image scanning modes than the front image scanner unit 25 described above.

Except for the front image scanner unit, the check processing device according to this embodiment of the invention is identical to the check processing device described above, and further description of aspects other than the front image scanner unit is omitted below.

FIG. 7 describes the image scanning modes that can be set for the front image scanner unit. In addition to the front image scanning modes 1 to 11 to which the front image scanner unit 25 can be set as described above, the image scanning mode setting unit 70 in the check processing device according to this embodiment of the invention can also set the front image scanner unit to the front image scanning modes 12 to 23 shown in FIG. 7. FIG. 8A to FIG. 8L describe the LED drive signals in the front image scanning modes 12 to 23 shown in FIG. 7. When the signal level of the drive signal is HIGH in FIG. 8A to (1), the corresponding LED is on and emits a front scanning light.

As shown in FIG. 8A, in front image scanning mode 12 the front image scanner unit causes the ultraviolet LED(UV) to emit during the time required to convey the check S1 one line past the image scanning position O. As a result, the scanner unit acquires a gray scale image of the check face obtained by emitting a UV light.

As shown in FIG. 8B to FIG. 8D, in front image scanning modes 13 to 15, the front image scanner unit causes one of the visible light LEDs, red LED(R), green LED(G), or blue LED (B), and the ultraviolet LED(UV) to emit sequentially during the time required for the check S1 to move one line past the image scanning position O. As a result, the scanner unit acquires a gray scale image of the check face obtained by emitting a single color of visible light (red, green, or blue light), and a gray scale image of the check face obtained by emitting UV light, as the front image data.

As shown in FIG. 8E, in front image scanning mode 16 the front image scanner unit causes the red LED(R), green LED (G), blue LED(B), and ultraviolet LED(UV) to emit sequentially during the time required for the check S1 to move one line past the image scanning position O. As a result, the scanner unit acquires a gray scale (composite gray) image of the check face obtained by emitting visible light (red, green, and blue light), and a gray scale image of the check face obtained by emitting UV light, as the front image data.

As shown in FIG. 8F, in front image scanning mode 17 the front image scanner unit causes the infrared LED(IR) and the ultraviolet LED(UV) to emit sequentially during the time required for the check S1 to move one line past the image scanning position O. As a result, the scanner unit acquires a gray scale image of the front by emitting infrared light, and a gray scale image of the check face obtained by emitting UV light, as the front image data.

As shown in FIG. 8G to FIG. 8I, in front image scanning modes 18 to 20 the front image scanner unit causes one of the visible light LEDs, red LED(R), green LED(G), or blue LED (B), the infrared LED(IR), and the ultraviolet LED(UV) to emit sequentially during the time required for the check S1 to move one line past the image scanning position O. As a result, the scanner unit acquires a gray scale image of the check face obtained by emitting a single color of visible light (red, green, or blue light), a gray scale image of the front by emitting infrared light, and a gray scale image of the check face obtained by emitting UV light, as the front image data.

As shown in FIG. 8J, in front image scanning mode 21 the front image scanner unit causes the red LED(R), green LED (G), blue LED(B), infrared LED(IR) and the ultraviolet LED (UV) to emit sequentially during the time required for the check S1 to move one line past the image scanning position O. As a result, the scanner unit acquires a gray scale (composite gray) image of the check face obtained by emitting visible light (red, green, and blue light), a gray scale image of the front by emitting infrared light, and a gray scale image of the check face obtained by emitting UV light, as the front image data.

As shown in FIG. 8K, in front image scanning mode 22 the front image scanner unit causes the red LED(R), green LED (G), blue LED(B), and the ultraviolet LED(UV) to emit sequentially during the time required for the check S1 to move one line past the image scanning position O. As a result, the scanner unit acquires a color image of the check face, and a gray scale image of the check face obtained by emitting UV light, as the front image data.

As shown in FIG. 8L, in front image scanning mode 23 the front image scanner unit causes the red LED(R), green LED (G), blue LED(B), infrared LED(IR) and the ultraviolet LED (UV) to emit sequentially during the time required for the check S1 to move one line past the image scanning position O. As a result, the scanner unit acquires a color image of the check face, a gray scale image of the front by emitting infrared light, and a gray scale image of the check face obtained by emitting UV light, as the front image data.

When a magnetic ink character read command (magnetic data read command) to read the magnetic ink characters S2 is received from the computer 80 in the check processing device with the front image scanner unit described above, the image scanning mode setting unit 70 sets the front image scanner unit 25 to front image scanning mode 5 (first front image scanning mode), for example. The check S1 is then conveyed through the check conveyance path P1, the magnetic data is acquired from the magnetic ink characters S2, and a gray scale image of the front by emitting infrared light (first front image data) is acquired. The gray scale image of the front by emitting infrared light is then sent with the magnetic data from the magnetic ink characters S2 to the computer 80. As a result, front image data from which noise such as the signature written on the check S1 is removed can be automatically acquired in addition to the magnetic data on the computer 80 side, and the recognition rate can be improved when recognizing the magnetic ink characters S2. Note that the magnetic ink character data of the magnetic ink characters S2 could be checked by the data checking unit 73 and the result sent to the computer 80.

If the front image scanning command to acquire the front image data is received together with or separately from the magnetic ink character read command from the computer 80, the image scanning mode setting unit 70 of the check processing device 1 sets the front image scanner unit 25 to front image scanning mode 11 (second image scanning mode), for example. The check S1 is then conveyed through the check conveyance path P1, the magnetic data in the magnetic ink characters S2 is acquired, and a color image of the front by emitting visible light (red, green, and blue light) (second front image data), and a gray scale image of the front by emitting infrared light (first front image data) are acquired as the front image data while the check S1 is conveyed past the image scanning position O. The gray scale image of the front obtained with infrared light is then sent with the magnetic data from the magnetic ink characters S2 to the computer 80. Alternatively, the gray scale image of the front obtained with infrared light is sent with a color image of the check S1 face to the computer 80.

As a result, front image data from which noise such as the signature written on the check S1 is removed can be automatically acquired in addition to the magnetic data and an image of the check face on the computer 80 side, and the recognition rate can be improved when recognizing the magnetic ink characters S2. Note that the magnetic ink character data of the magnetic ink characters S2 could be checked by the data checking unit 73 and the result sent to the computer 80.

If an authentication data acquisition command to acquire authentication data is received together with or separately from the magnetic ink character read command from the computer 80, the image scanning mode setting unit 70 of the check processing device 1 sets the front image scanner unit 25 to front image scanning mode 23 (third image scanning mode), for example.

The check S1 is then conveyed through the check conveyance path P1, the magnetic data in the magnetic ink characters S2 is acquired, and a gray scale image of the front by emitting infrared light (first front image data), a color image of the front by emitting visible light (red, green, and blue light) (second front image data), and a gray scale image of the check face obtained by emitting UV light (third front image data) are acquired as the front image data while the check S1 is conveyed past the image scanning position O. The gray scale image of the front obtained with infrared light, a color image of the front, and a gray scale image of the check face obtained by emitting UV light are then sent with the magnetic data from the magnetic ink characters S2 to the computer 80.

In addition to the magnetic data and images of the check face, the computer 80 can therefore also automatically acquire front image data containing authentication data, which is a specific image preprinted on the check S1 in a special ink that reflects UV light, in a form that can be easily identified optically, and both authentication and data recognition are possible.

Note that an authentication unit that authenticates checks S1 based on a gray scale image of the check face obtained by emitting UV light can also be incorporated in the control unit 61 of the check processing device 1. In this case, the magnetic ink character data of the magnetic ink characters S2 could be checked by the data checking unit 73, the check S1 could be authenticated by the authentication unit, and the results sent to the computer 80.

If a back image scanning command to acquire back image data is acquired with or independently of the magnetic ink character read command from the computer 80, the image scanning mode setting unit 70 sets the back image scanning mode of the back image scanner unit 26 to one of the back image scanning modes 1 to 11 based on the magnetic ink character read command or the back image scanning command.

For example, if the back image scanning command is a back image scanning command to acquire a gray scale image of the check back by emitting infrared light, the back image scanner unit 26 is set to back image scanning mode 5. The check S1 is then conveyed through the check conveyance path P1, the magnetic data of the magnetic ink characters S2 is acquired, and front image data and back image data are acquired while the check S1 is conveyed past the image scanning position O. The gray scale image of the front obtained with infrared light and the gray scale image of the back obtained by emitting infrared light (first back image data) are then sent with the magnetic data from the magnetic ink characters S2 to the computer 80. In addition to the magnetic data and front image data, the computer 80 can therefore automatically acquire back image data from which noise from a signature written on the check S1 is removed.

If, for example, the back image scanning command is a back image scanning command to acquire a color image of the back, the back image scanner unit 26 is set to the back image scanning mode 10. The check S1 is then conveyed through the check conveyance path P1, the magnetic data of the magnetic ink characters S2 is acquired, and front image data and back image data are acquired while the check S1 is conveyed past the image scanning position O. The color back image data (second back image data) is then sent with the front image data and the magnetic data from the magnetic ink characters S2 to the computer 80. As a result, a color image of the back that is close to what is seen with the eye is automatically acquired on the computer 80 with the magnetic data and the front image data.

This embodiment of the invention has the same effect as the check processing device 1 described above. In addition, because authentication data that can be easily recognized optically is included in the gray scale image of the check face obtained by emitting UV light when authentication data is printed on the check S1 in ink with high reflectivity to UV light, the computer 80 that receives this front image data can determine if the check S1 is authentic based on the gray scale image of the check face obtained by emitting UV light.

Variation 2

A back image scanner unit that has a red LED(R) that emits red light, a green LED(G) that emits green light, a blue LED (B) that emits blue light, and an ultraviolet LED(UV) that emits ultraviolet light as the light source of the back scanning light, and can independently control each LED to emit, can be used instead of the back image scanner unit 26 described above. A check processing device having this type of back image scanner unit has a plurality of image scanning modes that can be used individually or simultaneously to acquire back image data by emitting visible light (red, green, and blue light; or red, green, or blue light individually), and back image data by emitting UV light as the scanning light to image the back.

More specifically, the back image scanner unit in this embodiment substitutes an ultraviolet LED(UV) for the infrared LED(IR) of the back image scanner unit 26 described in FIG. 4 and FIG. 5, and in the back image scanning modes that acquire a gray scale image of the front by emitting infrared light in the embodiment described above, acquire a gray scale image of the front by emitting ultraviolet light. This back image scanner unit therefore has the same back image scanning modes 1 to 11 as the back image scanner unit 26 described above, except that ultraviolet light replaces infrared light.

In the check processing device according to this embodiment of the invention with the back image scanner unit described above, the image scanning mode setting unit 70 sets the desirable image scanning mode from among plural back image scanning modes based on the control command from the computer 80. The image scanning mode setting unit 70 can also set the back image scanning mode of the back image scanner unit independently of the front image scanning mode of the front image scanner unit 25.

For example, if an authentication data acquisition command to acquire authentication data is contained in the control command from the computer 80, the image scanning mode setting unit 70 sets the back image scanner unit to a scanning mode that acquires at least a gray scale image of the check back by emitting UV light as the back image data. The image scanning mode setting unit 70 then conveys the check S1 through the check conveyance path P1, acquires the magnetic data from the magnetic ink characters S2, and acquires the front image data and gray scale back image data by emitting UV light while the check S1 is conveyed past the image scanning position O. The gray scale image of the back obtained with UV light is then added to the front image data and the magnetic data from the magnetic ink characters S2 and sent to the computer 80.

In addition to the magnetic data and front image data, the computer 80 can therefore also automatically acquire back image data containing authentication data, which is a specific image preprinted on the check S1 in a special ink that reflects UV light, in a form that can be easily identified optically, and both authentication and data recognition are possible.

Variation 3

A back image scanner unit that has a red LED(R) that emits red light, a green LED(G) that emits green light, a blue LED (B) that emits blue light, an infrared LED(IR) that emits infrared light, and an ultraviolet LED(UV) that emits ultraviolet light as the light source of the back scanning light, and can independently control each LED to emit, can also be used instead of the back image scanner unit 26 described above. A check processing device having this type of back image scanner unit has a plurality of image scanning modes that can be used individually or simultaneously to acquire back image data by emitting visible light (red, green, and blue light; or red, green, or blue light individually), back image data by emitting infrared light, and back image data by emitting UV light as the scanning light to image the back. More specifically, this embodiment has back image scanning modes 1 to 23 that are identical to the scanning modes of the front image scanner unit described in variation 1 above.

In the check processing device according to this embodiment of the invention with the back image scanner unit described above, the image scanning mode setting unit 70 sets the desirable image scanning mode from among plural back image scanning modes based on the control command from the computer 80. The image scanning mode setting unit 70 can also set the back image scanning mode of the back image scanner unit independently of the front image scanning mode of the front image scanner unit 25.

For example, if an authentication data acquisition command to acquire authentication data is contained in the control command from the computer 80, the image scanning mode setting unit 70 sets the back image scanner unit to a scanning mode that acquires at least a gray scale image of the check back by emitting UV light as the back image data. The image scanning mode setting unit 70 then conveys the check S1 through the check conveyance path P1, acquires the magnetic data from the magnetic ink characters S2, front image data, and gray scale back image data by emitting UV light while the check S1 is conveyed past the image scanning position O. The gray scale image of the back obtained with UV light is then added to the front image data and the magnetic data from the magnetic ink characters S2 and sent to the computer 80.

In addition to the magnetic data and front image data, the computer 80 can therefore also automatically acquire back image data containing authentication data, which is a specific image preprinted on the check S1 in a special ink that reflects UV light, in a form that can be easily identified optically, and both authentication and data recognition are possible.

Other Embodiments

The front image scanner unit 25 and back image scanner unit 26 are disposed opposite each other at the image scanning position O in the embodiments described above, but the front image scanner unit 25 and back image scanner unit 26 could be offset from each other in the conveyance direction of the check S1.

It will also be obvious that the invention can be used in a check processing device 1 that does not have a card scanning mechanism and a receipt printing unit 15.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A media processing device configured to be connected to a control device, the media processing device comprising:
   a media conveyance mechanism that conveys a medium having magnetic ink characters printed on the front past a magnetic reading position and a front scanning position;
   a magnetic reading unit that acquires magnetic data from the magnetic ink characters on the conveyed medium at the magnetic reading position;
   a magnetic data recognition unit that recognizes the magnetic ink characters based on the magnetic data;
   a front image scanner unit that emits infrared light to acquire first front image data, emits visible light to acquire second front image data, and emits ultraviolet light to acquire third front image data;
   a control unit that, when at least a magnetic data read command is received from the control device, controls the media conveyance mechanism to convey the medium, controls the magnetic reading unit to acquire the magnetic data, controls the front image scanner unit to emit (i) infrared light to acquire the first front image data, (ii) visible light to acquire the second front image data, and (iii) ultraviolet light to acquire the third front image data;
an image data recognition unit that optically recognizes the magnetic ink characters based on at least the first front image data;
a data verification unit that confirms the magnetic ink characters based on at least the recognition result from the magnetic data recognition unit or the recognition result from the image data recognition unit; and
a first data transmission unit that sends the magnetic ink characters confirmed by the data verification unit to the control device;
wherein the data verification unit confirms the magnetic ink character data based on one or a combination of the magnetic data, the first front image data, the second front image data, and the third front image data.

2. The media processing device described in claim 1, wherein:
the front image scanner unit also emits visible light as the front image scanning light, the front image scanner unit emitting visible light to acquire second front image data; and
the control unit, when at least a front image scanning command to acquire the front image data is received from the control device, controls the media conveyance mechanism to convey the medium, controls the magnetic reading unit to acquire the magnetic data, and controls the front image scanner unit to emit visible light to acquire the second front image data;
wherein the image data recognition unit optically recognizes the magnetic characters based on at least the first front image data and the second front image data.

3. The media processing device described in claim 2, wherein:
the front image scanner unit also emits ultraviolet light as the front image scanning light, the front image scanner unit emitting ultraviolet light to acquire third front image data; and
the control unit, when at least the magnetic data read command is received from the control device, controls the media conveyance mechanism to convey the medium, controls the magnetic reading unit to acquire the magnetic data, controls the front image scanner unit to emit ultraviolet light to acquire the third front image data;
wherein the image data recognition unit optically recognizes the magnetic characters based on at least the first front image data and the third front image data.

4. The media processing device described in claim 2, wherein:
the front image scanner unit also emits ultraviolet light as the front image scanning light, the front image scanner unit emitting ultraviolet light to acquire third front image data; and
the control unit, when at least the front image scanning command is received from the control device, controls the media conveyance mechanism to convey the medium, controls the front image scanner unit to emit visible light to acquire the second front image data, controls the front image scanner unit to emit ultraviolet light to acquire the third image data;
wherein the image data recognition unit optically recognizes the magnetic characters based on at least the first front image data and the third front image data.

5. The media processing device described in claim 1, further comprising:
a back scanning position disposed to the conveyance path; and
a back image scanner unit that emits back image scanning light to the back of the conveyed medium to acquire back image data at the back scanning position, the back image scanner unit emitting infrared light to acquire first back image data;
wherein when at least a magnetic data read command is received from the control device, the control unit controls the media conveyance mechanism to convey the medium, controls the back image scanner unit to emit infrared light and acquire the first back image data, and sends the first back image data with the magnetic data to the control device.

6. The media processing device described in claim 1, further comprising:
a back scanning position disposed to the conveyance path; and
a back image scanner unit that emits back image scanning light to the back of the conveyed medium to acquire back image data at the back scanning position, the back image scanner unit emitting ultraviolet light to acquire third back image data;
wherein when at least a magnetic data read command is received from the control device, the control unit controls the media conveyance mechanism to convey the medium, controls the back image scanner unit to emit ultraviolet light and acquire the third back image data, and sends the third back image data with the magnetic data to the control device.

7. The media processing device described in claim 1, further comprising:
a back scanning position disposed to the conveyance path; and
a back image scanner unit that emits infrared light, ultraviolet light, and visible light as the back image scanning light, and emits the back image scanning light to the back of the conveyed medium to acquire back image data at the back scanning position;
wherein based on the received back image scanning command when a back image scanning command is received from the control device, the control unit acquires and sends to the control device back image data including at least one of the following group:
(1) first back image data acquired as the back image data by exposing the back of the medium to infrared light,
(2) second back image data acquired as the back image data by exposing the back of the medium to visible light, and
(3) third back image data acquired as the back image data by exposing the back of the medium to ultraviolet light.

8. A method of controlling a media processing device that can connect to a control device, comprising steps of:
when at least a magnetic data read command is received from the control device,
conveying a medium having magnetic ink characters printed on the front past a magnetic reading unit and a front image scanner unit by a media conveyance mechanism;
acquiring magnetic data from the magnetic ink characters with the magnetic reading unit;
recognizing the magnetic ink characters based on the acquired magnetic data;
emitting infrared light to the front of the medium and acquiring first front image data with the front image scanner unit;
emitting visible light to acquire second front image data with the front image scanner unit;

emitting ultraviolet light to acquire third front image data with the front image scanner unit;

optically recognizing the magnetic ink characters based on at least the acquired first front image data;

confirming the magnetic ink characters based on one or combination of the magnetic data, the first front image data, the second front image data, and the third front image data; and sending the magnetic ink characters, as confirmed in the confirming step, to the control device.

9. The method of controlling a media processing device described in claim 8, wherein:

when at least a front image scanning command is received from the control device, the steps performed by the front image, scanner unit are executed.

10. The method of controlling a media processing device described in claim 8, wherein:

the media processing device has a back image scanner unit; and the control method further comprises a step of conveying the medium with the media conveyance mechanism, emitting ultraviolet light to the back of the medium and acquiring third back image data with the back image scanner unit, and sending the third back image data with the magnetic data to the control device, when at least a magnetic data read command is received from the control device.

11. The method of controlling a media processing device described in claim 8, wherein:

the media processing device has a back image scanner unit;

the back image scanner unit can emit infrared light, ultraviolet light, and visible light; and when at least a back image scanning command is received from the control device, acquires and sends to the control device back image data including at least one of the following group:

(1) first back image data acquired as the back image data by exposing the back of the medium to infrared light, (2) second back image data acquired as the back image data by exposing the back of the medium to visible light, and (3) third back image data acquired as the back image data by exposing the back of the medium to ultraviolet light.

* * * * *